(12) United States Patent  (10) Patent No.: US 8,070,963 B2
Bomze  (45) Date of Patent: Dec. 6, 2011

(54) METHOD AND SYSTEM FOR BACKWASHING A FILTER

(75) Inventor: Vladimir Bomze, Hadera (IL)

(73) Assignee: Odis Irrigation Equipment Ltd., Petach-Tikva (IL)

( * ) Notice: Subject to any disclaimer, the term of this patent is extended or adjusted under 35 U.S.C. 154(b) by 393 days.

(21) Appl. No.: 11/774,725

(22) Filed: Jul. 9, 2007

(65) Prior Publication Data

US 2011/0240562 A1 Oct. 6, 2011

(51) Int. Cl.
*B01D 21/00* (2006.01)
*B01D 21/02* (2006.01)
*B01D 21/24* (2006.01)
*C02F 1/00* (2006.01)

(52) U.S. Cl. ........ 210/741; 210/744; 210/800; 210/801; 210/97; 210/106; 210/311; 210/312; 210/409; 210/410; 210/411; 210/412; 210/513; 210/532.1; 210/533; 210/534

(58) Field of Classification Search ............. 210/97, 210/106, 409, 411, 521, 532.1, 533, 744, 210/800, 801, 803, 741, 410, 513, 534, 523, 210/299, 311, 312, 412, 413, 415; 417/534; 92/130 A, 130 B, 134; 137/565.17, 565.01, 137/565.11, 565.13, 565.15; 134/167 R, 134/168 R, 176, 179
See application file for complete search history.

(56) References Cited

U.S. PATENT DOCUMENTS

| | | | |
|---|---|---|---|
| 3,554,377 A | 1/1971 | Miller | |
| 3,883,427 A | 5/1975 | Oldham et al. | |
| 4,111,806 A | 9/1978 | Wright et al. | |
| 5,082,560 A | 1/1992 | Eli et al. | |
| 5,529,698 A | 6/1996 | Timmons | |
| 5,676,834 A * | 10/1997 | Kuntz | 210/321.6 |
| 6,103,109 A | 8/2000 | Noyes et al. | |
| 6,478,552 B1 | 11/2002 | Batten et al. | |
| 6,500,344 B1 | 12/2002 | Lee et al. | |
| 6,562,246 B2 * | 5/2003 | McGowan | 210/791 |
| 2005/0000870 A1 * | 1/2005 | Ricketts | 210/107 |

FOREIGN PATENT DOCUMENTS

| | | |
|---|---|---|
| EP | 0514774 A1 | 11/1992 |
| JP | 57045318 A2 | 3/1982 |
| WO | 92/13626 A1 | 8/1992 |

OTHER PUBLICATIONS

Search Report of PCT Patent application publication WO2009007961A3.

* cited by examiner

*Primary Examiner* — Duane Smith
*Assistant Examiner* — Paul J Durand
(74) *Attorney, Agent, or Firm* — Reches Patents

(57) ABSTRACT

A method for purifying fluids and a sedimentation tank, the sedimentation tank includes: a perforated plate spaced from an upper and of the sedimentation tank dividing the sedimentation tank into an upper chamber and a lower chamber; an inlet adapted to inlet fluid into the tank; a first outlet, positioned above the perforated plate for outletting a clarified fraction of the fluid; a second outlet positioned at a bottom of the tank, for outletting a concentrated sludge fraction of the fluid; a pump; and a washing mechanism, positioned at least partially above the perforated plate; wherein the pump is adapted to provide a washing fluid to the washing mechanism when a level of fluid in the sedimentation tank is below a predefined level; and wherein the washing mechanism washes an upper surface of the perforated plate by the washing fluid.

22 Claims, 6 Drawing Sheets

US 8,070,963 B2

METHOD AND SYSTEM FOR BACKWASHING A FILTER

FIELD OF THE INVENTION

The present invention relates to a method and apparatus for treating a liquid mixture in order to separate a clarified fraction therefrom, leaving a concentrated sludge fraction. The invention is particularly applicable for treating municipal or industrial waste water in order to enable such waste water to be reused for municipal, industrial or agricultural purposes.

BACKGROUND OF THE INVENTION

Municipal, agricultural, industrial or other waste fluids (including but not limited to water, sewer), as well as water from rivers or lakes, must first be treated in order to remove substances which may be harmful, or which cause bad taste or odor. Many techniques are known for this purpose. One technique is a sedimentation technique wherein the solid particles or other heavy substances are permitted to separate by sedimentation from the liquid mixture.

There is a growing need to provide effective filtering processes, especially for pressurized fluids.

SUMMARY OF THE INVENTION

A sedimentation tank, that includes: a perforated plate spaced from an upper end of the sedimentation tank dividing the sedimentation tank into an upper chamber and a lower chamber; an inlet adapted to inlet fluid into the tank; a first outlet, positioned above the perforated plate for outletting a clarified fraction of the fluid; a second outlet positioned at a bottom of the tank, for outletting a concentrated sludge fraction of the fluid; a pump; and a washing mechanism, positioned at least partially above the perforated plate; wherein the pump is adapted to provide a washing fluid to the washing mechanism when a pressure level of fluid in the sedimentation tank is below a predefined level; and wherein the washing mechanism washes an upper surface of the perforated plate by the washing fluid.

A method for purifying a fluid, the method: receiving fluid to a sedimentation tank via an inlet positioned below a perforated plate; wherein the perforated plate is spaced from an upper end of the sedimentation tank such as to divide the sedimentation tank into an upper chamber and a lower chamber; outletting a clarified fraction of the fluid via a first outlet, positioned above the perforated plate; outletting a concentrated sludge fraction of the fluid via a second outlet positioned at a bottom of the tank; providing, by a pump, a washing fluid to a washing mechanism when a pressure level of fluid in the sedimentation tank and outside the pump is below a predefined level; and washing an upper surface of the perforated plate by the washing mechanism that is positioned at least partially above the perforated plate.

BRIEF DESCRIPTION OF THE DRAWINGS

The foregoing and other objects, features, and advantages of the present invention will become more apparent from the following detailed description when taken in conjunction with the accompanying drawings. In the drawings, similar reference characters denote similar elements throughout the different views, in which.

DETAILED DESCRIPTION OF THE DRAWINGS

Figure 1:
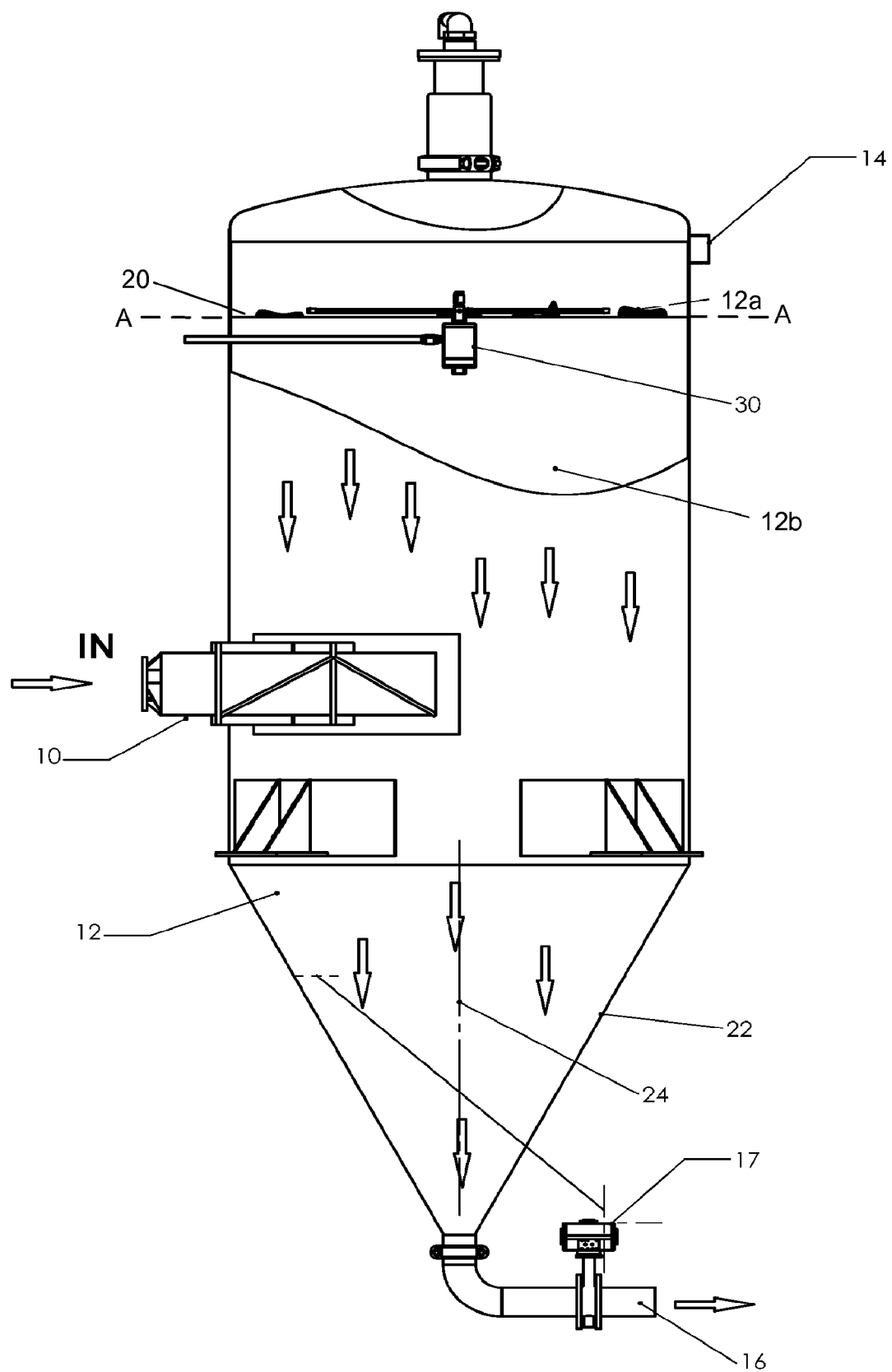
FIGS. 1 and 6 are cross-sectional view of a sedimentation tank, according to various embodiment of the invention.

The apparatus illustrated in the drawings is intended particularly for treating fluids such as but not limited to municipal or industrial waste water in order to make it suitable for reuse for municipal, industrial or agricultural purposes.

Fluid is provided to inlet 10 of a sedimentation tank 12. There, the fluid is separated into a clarified fraction removed via first outlet 14 at the upper end of sedimentation tank 12, and a concentrated sludge fraction removed via second outlet 16 at the lower end of sedimentation tank 12.

Figure 3:
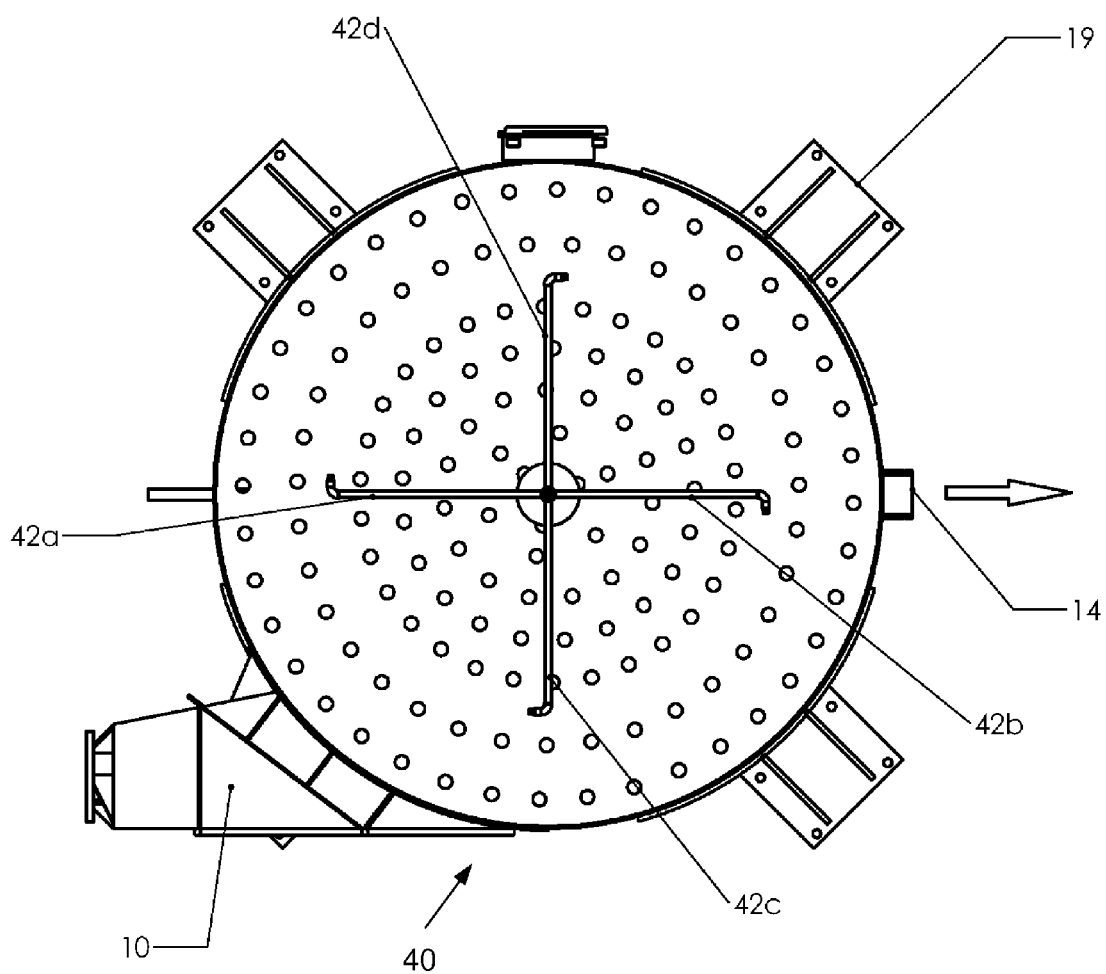
FIG. 3 is a cross-sectional view of a sedimentation tank, according to an embodiment of the invention.

Sedimentation tank 12 is conveniently a large, vertical, cylindrical sedimentation tank supported above the ground by legs 19 (illustrated in FIG. 3). The sedimentation tank includes flat perforated plate 20 fixed horizontally at the upper end of the sedimentation tank so as to divide its interior into an upper chamber 12a and a lower chamber 12b.

The clarified fluid outlet 14 at the upper end of sedimentation tank 12 is above perforated plate 20, to communicate with the upper chamber 12a, and, as shown in FIG. 3 extends radially of the upper chamber 12a. The second outlet 16 is at the bottom of the lower chamber 12b and is provided with a conical funnel 22 so as to direct the concentrated sludge settling at the bottom of the chamber through outlet 16.

Conveniently, the distance between inlet 10 and perforated plate 20 is much larger than the distance between inlet 10 and the upper end of conical funnel 22. Conveniently, the ratio between these distances is about four to one.

As shown particularly in FIG. 3, inlet 10 is tangential to the sedimentation tank 12 so as to impart a rotational flow of fluid when introduced into the lower chamber 12b. This flow into the lower chamber 12b has a rotational velocity in the horizontal direction adjacent the outer periphery of the lower chamber, and a lower rotational velocity in the horizontal direction adjacent to a central axis 24 of sedimentation tank 12. It is noted that the fluid continues to flow in a rotational manner even at upper chamber 12a, after passing through perforated plate.

The fluid that passes through perforated plate 20 usually includes particles that are small enough to pass through holes 20a. These particles can accumulate and eventually be outputted through first outlet 14. In order to limit the amount of particles that flow through first outlet 14 the upper part of perforated plate 20 should be cleaned.

The cleaning process involves emptying at least the upper chamber 12a and at least a portion of the lower chamber 12b from fluid and washing the upper part of perforated plate 20 with a washing fluid. The washing fluid can be the fluid that is provided to sedimentation tank 12, especially fluid taken from about the level of perforated plate 20, such as to receive a relatively clean fluid, or can be provided from a source outside the sedimentation tank 12.

The cleaning process can be triggered in various manners. For example, a pump such as air fluid pump 30 can be positioned near perforated plate 20 (conveniently below perforated plate 20) and can provide the washing fluid to a washing mechanism when the pressure level of the fluid within sedimentation tank 12 is below a predefined level. It is noted that the air fluid pump can be replaced by other pumps, such as but not limited to a spring based pump.

Figure 2:
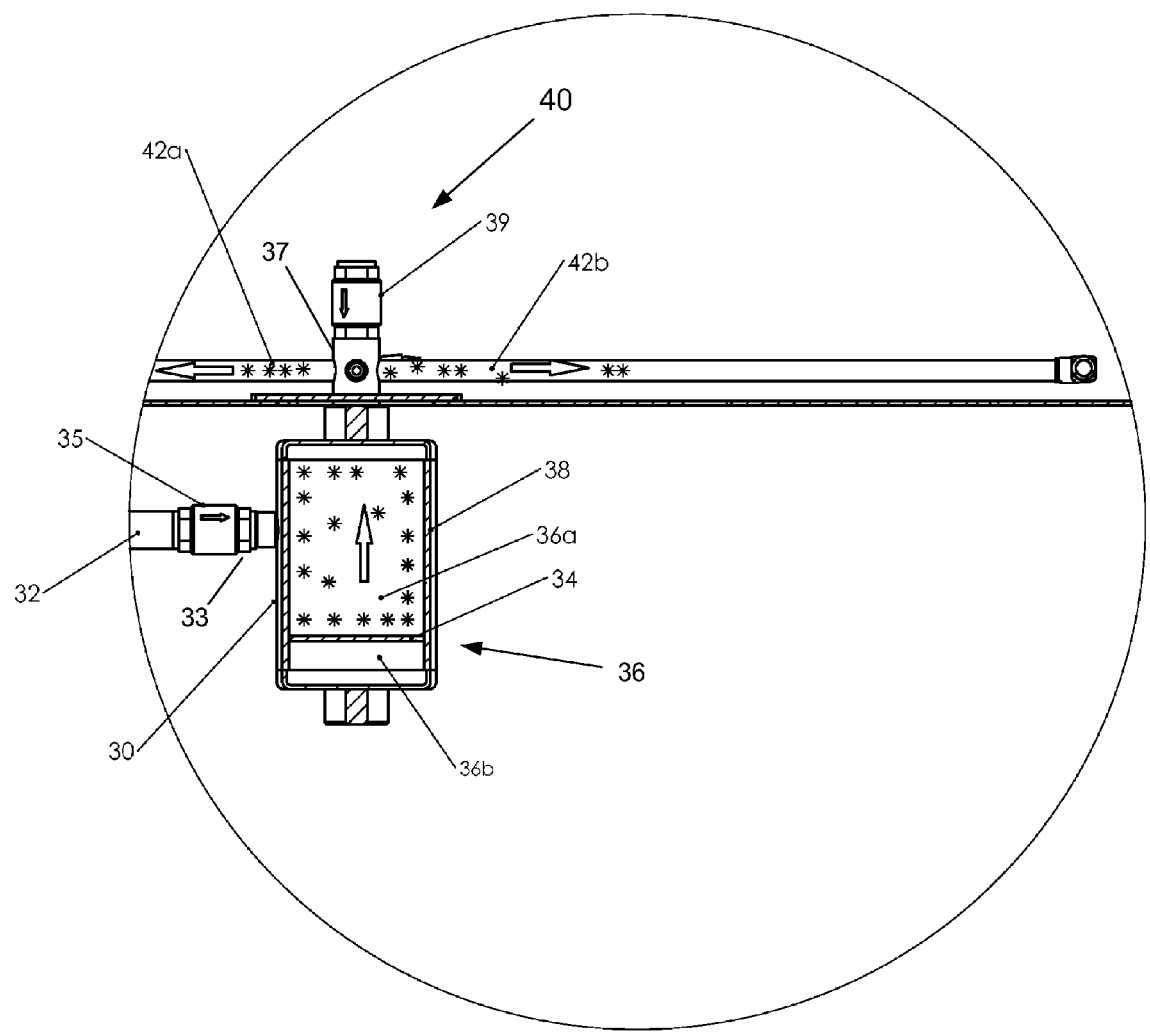
FIG. 2 is a cross-sectional view of a pump according to an embodiment of the invention.

FIG. 2 is a cross-sectional view of pump 30 according to an embodiment of the invention.

Pump, such as air fluid pump 30 includes a pump inlet 32, movable element 34, pump outlet 39 and housing 38. Movable element 34 can be a piston, a flexible membrane and the like. The term movable element illustrates an element that can be at least partially moved from position to another. Thus, at least a portion of the movable element can move. Movable element 34 (or a portion of the movable element) can move within housing 38. Movable element 34 separates the interior of housing 38 to pump upper chamber 36a and to pump lower chamber 36b. Pump lower chamber 36b is filled with gas.

At a pre-cleaning phase fluid that can enter via one-directional valve 39 prevents fluid (and optionally via other parts of the washing system 40) from air fluid pump at substantially the beginning of the cleaning process.

For simplicity of explanation it is assumed that the washing fluid is fluid that is provided from a location that is slightly below perforated plate 20.

Before the cleaning process is triggered, the pressure level of fluid within the sedimentation tank prevents fluid within the pump to exit through the washing mechanism. Fluid can enter sedimentation tank via a unidirectional value that prevents fluid to exit the pump. The pressurized fluid forces movable element 34 to be in a first position and to press the gas within pump lower chamber 36b.

The pressure level of fluid within sedimentation tank 12 can be lowered when valve 17 is opened thus allowing fluid to flow through second outlet 16 such as to drain sedimentation tank 12 and to reduce the pressure level of fluid within the sedimentation tank 12. Once the fluid pressure level (outside the pump) decreases the fluid within pump 36 is at a higher pressure level. Movable member 34 can also force (by pressurized gas within pump lower chamber 36b) the fluid outside pump 36. Accordingly, fluid exits pump and flow through washing mechanism 40.

Conveniently, the washing fluid passes through an internal tunnel formed within an upper plug 37. The tunnel has an inlet at the bottom of upper plug 37 and has multiple outlets.

Fluid can enter pump 36 by fluid inlet 32 that can be preceded by unidirectional value 35 and even filter 33. Filter 33 can receive (via filter inlet and/or via a pump connected to filter inlet) fluid from a location selected such as to provide relatively clean fluid. This location is usually within the upper portion of sedimentation tank 12.

Figure 6:
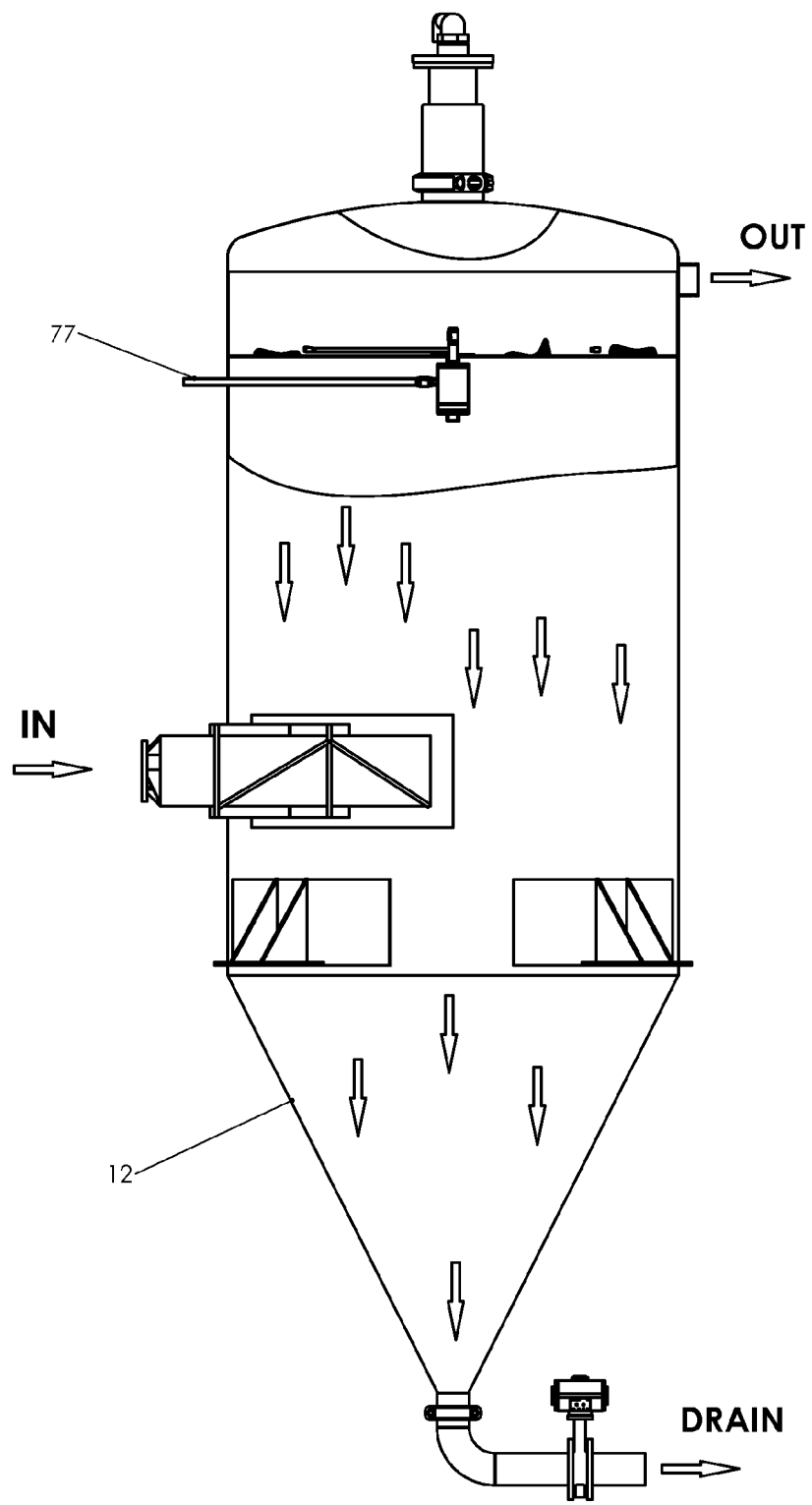

FIG. 6 illustrates a sedimentation tank that includes an inlet 77 for providing fluid to pump via a fluid source outside tank 12.

FIG. 3 is a cross-sectional view of sedimentation tank 12, according to an embodiment of the invention.

This cross sectional view is taken along an imaginary horizontal plane that is referred to as plane A-A in FIG. 1.

FIG. 3 illustrates a washing mechanism 40 that includes four pipes 42a-42d and four nozzles 44a-44d that wash the upper par of perforated plate 20. FIG. 3 also illustrates legs 19 that support tank 12.

Washing mechanism 40 includes pipes 42a-42d and nozzles 44a-44d. Washing fluid is provided to washing mechanism when the pressure level of fluid at the vicinity of washing mechanism 40 is below a certain pressure level.

Conveniently, the washing fluid can be provided through one or more tunnels formed in upper plug 37 but this is not necessarily so. For example, upper plug 37 can include an internal tunnel that is connected to pipes 42a-42d and especially to a first end of each of these pipes. The other end of these pipes is connected to nozzles 44a-44d.

Nozzles 44a-44d can be fixed nozzles, rotating nozzles or a combination thereof. For example at least one nozzle can be fixed while at least one other nozzle can be a rotating nozzle.

Pipes 42a-42d can be fixed or can rotate about a common central axis such as axis 24. Nozzles 44a-44d are conveniently oriented in relation to perforated plate 20, and are conveniently oriented at a relatively small angle in relation to perforated plate 20.

FIG. 3 illustrates four pipes that are oriented at about ninety degrees from each other. It is noted that the number of pipes as well as the spatial relationship between these pipes can differ without falling out of the true spirit of the invention.

It is further noted that the four nozzles 44a-44b are located at the same distance from the center of perforated plate 20, but this is not necessarily so.

Figure 4:
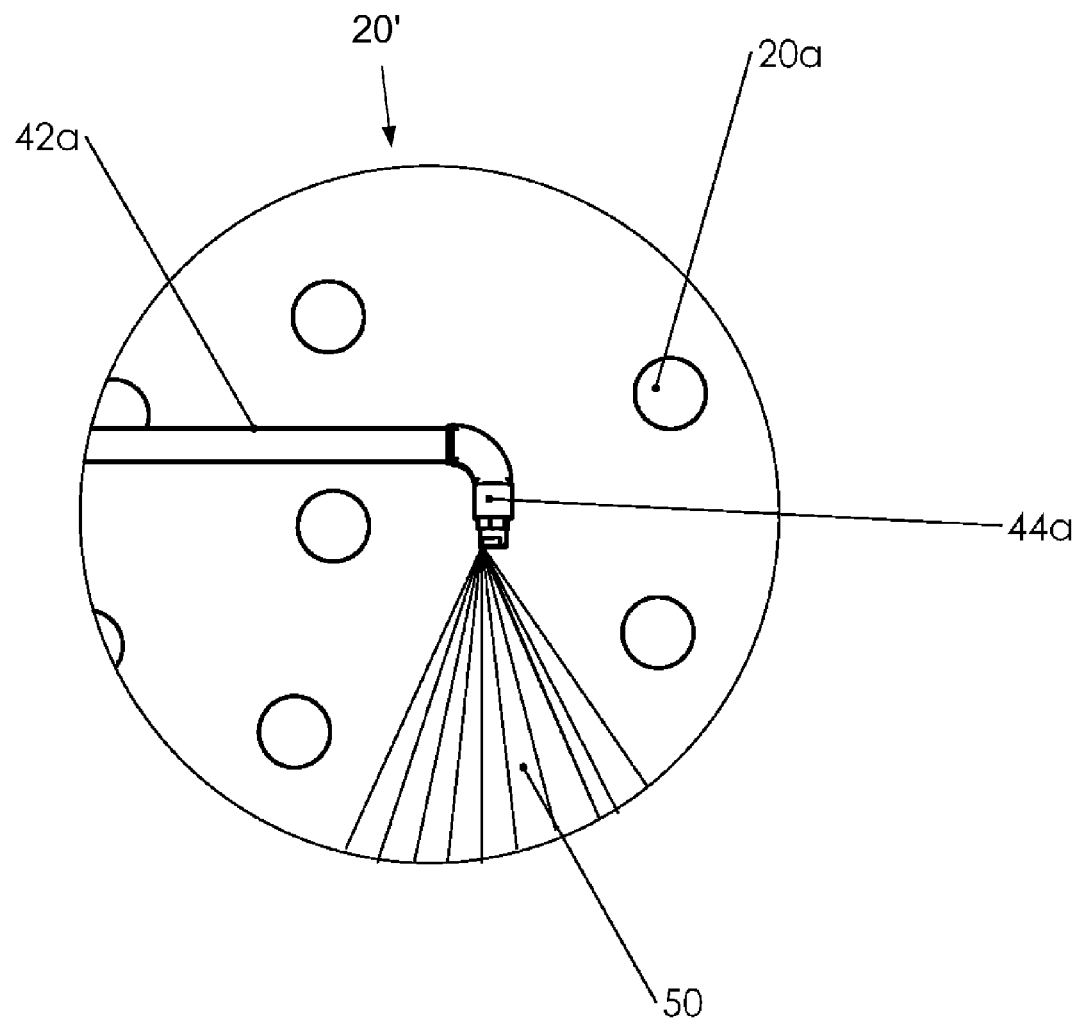
FIG. 4 illustrates a small portion of a perforated plate of the sedimentation tank of FIG. 1 and of a nozzle, according to an embodiment of the invention.

FIG. 4 provides an illustration of a small portion 20' of perforated plate 20 that is being washed (dashed lines 50 illustrated the flow of fluid from nozzle 44a) by nozzle 44a.

Conveniently, the washing process is triggered in predefined intervals, but this is not necessarily so.

Conveniently, the washing process can be triggered in response to the purity level of the clarified fraction removed via an outlet 14, to expected cleanness level of the fluid that enters inlet 10, and the like. More frequent cleaning process can improve the purity level of the clarified fraction removed.

Figure 5:
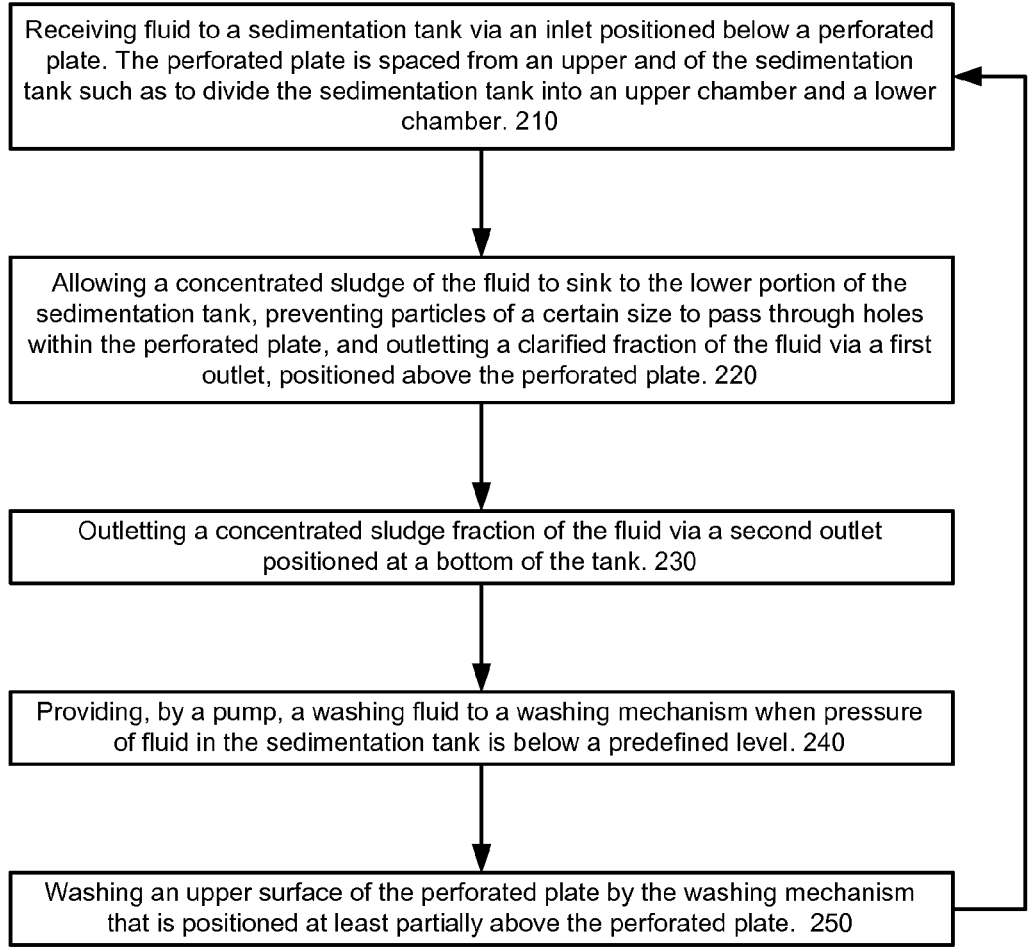
FIG. 5 illustrates a method for filtering fluid according to an embodiment of the invention.

FIG. 5 illustrates method 200 for filtering fluid according to an embodiment of the invention.

Method 200 starts by stage 210 of receiving fluid to a sedimentation tank via an inlet positioned below a perforated plate. The perforated plate is spaced from an upper and of the sedimentation tank such as to divide the sedimentation tank into an upper chamber and a lower chamber.

Stage 210 is followed by stage 220 of allowing a concentrated sludge of the fluid to sink to the lower portion of the sedimentation tank, preventing particles of a certain size to pass through holes within the perforated plate, and outletting a clarified fraction of the fluid via a first outlet, positioned above the perforated plate.

Stage 220 is followed by stage 230. Stage 230 includes outletting a concentrated sludge fraction of the fluid via a second outlet positioned at a bottom of the tank.

During the draining process the pressure level of fluid in the sedimentation is lowered below a predefined level. The draining process of stage 230 continues but stage 240 is initiated. Accordingly, stage 240 is illustrated by box 240 that is connected to a middle section of box 230.

Stage 240 includes providing, by a pump, a washing fluid to a washing mechanism when a pressure level of fluid in the sedimentation tank is below a predefined level.

Conveniently, stage 240 includes at least one of the following: (i) allowing a movable element of the pump to progress to an upper position such as to enable washing fluid to flow from the pump to the cleaning mechanism; (ii) allowing compressed gas positioned within a pump lower chamber that is defined by the movable element, to lift the movable element; wherein the compressed gas is compressed by fluid that enters a pump upper chamber; (iii) allowing a spring positioned within a pump lower chamber that is defined by the movable element, to lift the movable element; wherein the spring is pressed by fluid that enters a pump upper chamber.

Stage 240 is followed by stage 250 of washing an upper surface of the perforated plate by the washing mechanism that is positioned at least partially above the perforated plate. It is noted that stage 250 is executed as long as washing fluid is provided.

Conveniently, stage 250 is followed by stage 210, thus enabling multiple repetitions of various stages of method 200.

Conveniently, these repetitions include periodically draining the sedimentation tank such as to periodically reduce the pressure level of fluid within the sedimentation tank below the predefined level.

Conveniently, these repetitions include periodically providing washing fluid to the pump and periodically draining the sedimentation tank such as to periodically reduce the pressure level of fluid within the sedimentation tank below the predefined level.

Conveniently, stage 250 includes at least one of the following: (i) washing the upper surface of the perforated plate by at least one fixed nozzle; (ii) washing the upper surface of the perforated plate by at least one rotating nozzle; and washing the upper surface of the perforated plate by a washing mechanism that includes multiple pipes that are adapted to rotate along a common central axis.

Conveniently, method 200 includes allowing fluid to enter the pump via a pump inlet after passing through a filter and a unidirectional valve.

Conveniently, method 200 includes providing the filter fluid from a location selected such as to provide relatively clean fluid.

The present invention can be implemented by employing conventional tools, methodology and components. Accordingly, the details of such tools, components and methodology are not set forth herein in detail. In the above descriptions, numerous specific details are set forth, in order to provide a thorough understanding of the present invention. However, it should be recognized that the present invention might be practiced without resorting to the details specifically set forth.

Only few elucidatory embodiments of the present invention and but a few examples of its versatility are shown and described in the present disclosure. It is to be understood that the present invention is capable of use in various other combinations and environments and is capable of changes or modifications within the scope of the inventive concept as expressed herein.

I claim:

1. A sedimentation tank, comprising:
    a perforated plate spaced from an upper end of the sedimentation tank dividing the sedimentation tank into an upper chamber and a lower chamber;
    an inlet adapted to inlet fluid into the tank;
    a first outlet, positioned above the perforated plate for outletting a clarified fraction of the fluid; wherein only the perforated plate filters the fluid to provide the clarified fraction of the fluid;
    a second outlet positioned at a bottom of the tank, for outletting a concentrated sludge fraction of the fluid;
    a pump positioned in proximity to the perforated plate and within the sedimentation tank;
    and a washing mechanism that differs from the perforated plate, positioned at least partially above the perforated plate in proximity to the perforated plate and within the sedimentation tank;
    wherein the pump is adapted to provide a washing fluid to the washing mechanism when a pressure level of fluid in the sedimentation tank is below a predefined level; and
    wherein the washing mechanism washes an upper surface of the perforated plate by the washing fluid.

2. The sedimentation tank according to claim 1 wherein the pump comprises a movable element that is located at a lower position while fluid within the sedimentation tank is above the predefined level and wherein the movable element is allowed to progress to an upper position once the fluid is below the predefined level; wherein when positioned at the upper position the movable element enables washing fluid to flow from the pump to the washing mechanism.

3. The sedimentation tank according to claim 1 wherein the bottom of the sedimentation tank is shaped as a conical funnel and wherein a distance between the inlet and the perforated plate is four times a distance between the inlet and an upper end of the conical funnel.

4. The sedimentation tank according to claim 1, comprising an internal tunnel for providing the washing fluid to pipes of the washing mechanism, wherein the internal tunnel is formed in an upper plug that is coupled between the pump and pipes of the washing mechanism.

5. The sedimentation tank according to claim 1 wherein the pump comprises a movable element dividing the pump housing interior to a pump upper chamber and a pump lower chamber; wherein the lower chamber is filled with gas that is compressed by fluid that enters the pump upper chamber.

6. The sedimentation tank according to claim 1 wherein the pump comprises a movable element dividing the pump housing interior to a pump upper chamber and a pump lower chamber; wherein the lower chamber includes a spring that is positioned between the movable element and a lower end of pump lower chamber.

7. The sedimentation tank according to claim 1 further comprising a controller adapted to periodically initiate washing sequences by periodically draining the sedimentation tank.

8. The sedimentation tank according to claim 1 further comprising a controller adapted to periodically initiate washing sequences by periodically providing washing fluid to the pump and periodically drain the sedimentation tank.

9. The sedimentation tank according to claim 1 wherein the washing mechanism comprises at least one fixed nozzle positioned within the sedimentation tank and at least one rotating nozzle positioned within the sedimentation tank.

10. The sedimentation tank according to claim 1 wherein the washing mechanism comprises at least one of a fixed nozzle and a rotating nozzle wherein each nozzle is positioned within the sedimentation tank and oriented in relation to the perforated plate.

11. The sedimentation tank according to claim 1 wherein the washing mechanism comprises multiple pipes that are adapted to rotate along a common central axis.

12. A method for purifying a fluid, comprising:
    receiving fluid to a sedimentation tank via an inlet positioned below a perforated plate; wherein the perforated plate is spaced from an upper end of the sedimentation tank such as to divide the sedimentation tank into an upper chamber and a lower chamber;
    outletting a clarified fraction of the fluid via a first outlet, positioned above the perforated plate; wherein only the perforated plate filters the fluid to provide the clarified fraction of the fluid;
    outletting a concentrated sludge fraction of the fluid via a second outlet positioned at a bottom of the tank;
    providing, by a pump, a washing fluid to a washing mechanism when a pressure level of fluid in the sedimentation tank and outside the pump is below a predefined level; and
    washing an upper surface of the perforated plate by the washing mechanism that is positioned at least partially above the perforated plate;
    wherein the pump is positioned in proximity to the perforated plate and within the sedimentation tank;
    and wherein the washing mechanism differs from the perforated plate and is positioned at least partially above the perforated plate in proximity to the perforated plate and within the sedimentation tank.

13. The method according to claim 12 wherein the providing comprises allowing a movable element of the pump to progress to an upper position such as to enable washing fluid to flow from the pump to the washing mechanism.

14. The method according to claim 12 wherein the providing comprises allowing compressed gas positioned within a pump lower chamber that is defined by the movable element, to at least partially lift the movable element; wherein the compressed gas is compressed by fluid that enters a pump upper chamber.

15. The method according to claim 12 wherein the providing comprises allowing a spring positioned within a pump lower chamber that is defined by the movable element, to lift the movable element; wherein the spring is pressed by fluid that enters a pump upper chamber.

16. The method according to claim 12 further comprising periodically draining the sedimentation tank such as to periodically reduce the pressure level of fluid within the sedimentation tank below the predefined level.

17. The method according to claim 12 further comprising periodically providing washing fluid to the pump and periodically draining the sedimentation tank such as to periodically reduce the pressure level of fluid within the sedimentation tank below the predefined level.

18. The method according to claim 12 wherein the stage of washing comprises washing the upper surface of the perforated plate by at least one fixed nozzle and by at least one rotating nozzle.

19. The method according to claim 12 wherein the stage of washing comprises washing the upper surface of the perforated plate by at least one of a fixed nozzle positioned within the sedimentation tank and a rotating nozzle positioned within the sedimentation tank wherein each nozzle is oriented in relation to the perforated plate.

20. The method according to claim 12 wherein the stage of washing comprises washing the upper surface of the perforated plate by a washing mechanism that comprises multiple pipes that are adapted to rotate along a common central axis.

21. The method according to claim 12 further comprising comprising providing via an internal tunnel the washing fluid to pipes of the washing mechanism, wherein the internal tunnel is formed in an upper plug that is coupled between the pump and pipes of the washing mechanism.

22. The sedimentation tank according to claim 21 further comprising providing the filter fluid from a location selected as to provide clean fluid.

* * * * *